US007908601B2

(12) United States Patent
Clemm et al.

(10) Patent No.: US 7,908,601 B2
(45) Date of Patent: Mar. 15, 2011

(54) COMPUTER METHOD AND APPARATUS FOR MERGING SOFTWARE CONFIGURATIONS WHEN A CHANGE SET SPANS MULTIPLE ARTIFACTS

(75) Inventors: Geoffrey M. Clemm, Concord, MA (US); Kim Letkeman, Nepean (CA)

(73) Assignee: International Business Machines Corporation, Armonk, NY (US)

( * ) Notice: Subject to any disclaimer, the term of this patent is extended or adjusted under 35 U.S.C. 154(b) by 1169 days.

(21) Appl. No.: 11/555,521

(22) Filed: Nov. 1, 2006

(65) Prior Publication Data
US 2008/0104581 A1 May 1, 2008

(51) Int. Cl.
G06F 9/44 (2006.01)
G06F 15/177 (2006.01)
(52) U.S. Cl. ......... 717/170; 717/121; 717/122; 715/735
(58) Field of Classification Search .................. 717/121, 717/122, 170
See application file for complete search history.

(56) References Cited

U.S. PATENT DOCUMENTS

| 5,907,705 | A  | * | 5/1999  | Carter ............................ 717/122 |
| 5,922,072 | A  | * | 7/1999  | Hutchinson et al. .............. 713/2 |
| 6,080,207 | A  | * | 6/2000  | Kroening et al. ............. 717/172 |
| 6,385,768 | B1 | * | 5/2002  | Ziebell .......................... 717/121 |
| 6,523,027 | B1 | * | 2/2003  | Underwood .......................... 1/1 |
| 7,447,760 | B2 | * | 11/2008 | Forth et al. .................... 709/223 |
| 7,606,828 | B2 | * | 10/2009 | Koerner et al. ...................... 1/1 |
| 7,707,249 | B2 | * | 4/2010  | Spataro et al. ................ 709/205 |
| 2002/0150306 | A1 |  | 10/2002 | Baron |
| 2003/0037325 | A1 | * | 2/2003 | Hargrove et al. ............. 717/175 |
| 2004/0045001 | A1 | * | 3/2004 | Bryant .......................... 718/100 |
| 2004/0078105 | A1 |  | 4/2004 | Moon et al. |
| 2005/0204367 | A1 |  | 9/2005 | Minium, Jr. et al. |

OTHER PUBLICATIONS

Conradi et al., "Version Models for Software Configuration Management", Jun. 1998, ACM Computing Surveys (CSUR), vol. 30, Issue 2, pp. 232-282.*
Brimele, "Branching and Merging Primer", Aug. 2006, Microsoft Visual Studio 2005 Technical Articles, pp. 1-6.*
Appleton et al., "Streamed Lines: Branching Patterns for Parallel Software Development", PLoP '98 (Patterns Languages of Programs) conference, pp. 1-15.*

* cited by examiner

*Primary Examiner* — Wei Y Zhen
*Assistant Examiner* — Chih-Ching Chow
(74) *Attorney, Agent, or Firm* — Hamilton, Brook, Smith & Reynolds, P.C.

(57) ABSTRACT

Computer method, apparatus and system for merging software configurations. The invention system and method includes a workspace providing a work environment in which to perform operations on a subject software configuration. The workspace identifies a change set of current changes being made to the subject software configuration. A merge tool is coupled to perform software configuration merges in the workspace. The workspace accumulates change sets in a merge of each artifact forming the subject software configuration and passes the accumulated change sets to the merge tool. Consequently, artifact merges are made in the context of substantially all previous merge decisions. The workspace also tracks deferred change sets and the system enables a user to re-invoke the merge tool with respect to artifacts having deferred change sets.

12 Claims, 4 Drawing Sheets

COMPUTER METHOD AND APPARATUS FOR MERGING SOFTWARE CONFIGURATIONS WHEN A CHANGE SET SPANS MULTIPLE ARTIFACTS

BACKGROUND OF THE INVENTION

A software artifact is a persistent representation of an aspect of a software system. Common examples of software artifacts are files and directories containing the source code of a software system, but other examples of artifact include requirements, end-user documentation, system models, and system tests. A significant state of a software artifact is saved as a version of that artifact, and the sets of versions of a given artifact define the history of that artifact.

A software confirmation is a set of software artifact versions, where only one version of a given artifact is elected by a given software configuration. A software change set identifies a logical change to a configuration, and consists of a set of one or more changes to one or more artifacts. An alternative characterization of a software configuration is that is consists of the set of change sets that have resulted in that configuration. The result of merging two software configurations is logically the union of the corresponding two sets of change sets.

A logical change set can span multiple artifacts in a configuration, but merge tools operate on one artifact at a time. When a signal artifact is merged during a configuration merge, a user accepts or reflects a change that is part of a particular change set. But when that user subsequently merges another artifact in that configuration containing additional changes which are part of that same change set, the user is given no guidance about how the has previously treated that change set. As a result, he must notice when the is encountering a logically related change, and then either must remember whether he previously accepted or rejected that change or must correctly reconstruct the logic that caused him to accept or reject that change. Since a user usually encounters multiple logical changes in a singe artifact, and since merge decisions are often very complex and require hours (or sometimes days) to resolve, it can be very difficult to recognize logically related merge decisions in a subsequent artifact, and very difficult to remember or to reproduce the logic that led to a particular merge decision.

Some domain-specific merge tools (such as tools for a specific language) are designed to operate concurrently on multiple artifacts from that domain. However, these merge tools cannot deal with artifacts from other domains, so the same problem arises when a logical change results in changes to multiple domains.

SUMMARY OF THE INVENTION

The present invention addresses the shortcomings of the prior art. In particular, the present invention provides a computer method and system in which changes to software artifacts are made in the context of a workspace, and the workspace identifies a change set that identifies the logical change currently being performed to the software configuration of that workspace. When a new version is created, the version-creation tool records in the new version which parts of the new version have been modified, and associates those changes with the current change set of the workspace. The merge tool is enhanced to accept as input a list of accepted and rejected change sets, and returns as output the additional change sets that have been accepted and rejected during the operation of that merge tool. When a merge that involves multiple artifacts is invoked in the workspace, the workspace accumulates the list of change sets that have been accepted and rejected in respective merges of each artifact, and passes the current value of these lists to the merge tool when it is invoked on the next artifact. The individual artifact merges are then made in the context of all previous merge decisions of the subject configuration.

In a preferred embodiment, computer apparatus and method for merging software configurations comprise:

a workspace providing a work environment in which to perform operations on a subject software configuration; and a merge tool coupled to perform software configuration merges in the workspace.

The workspace identifies a change set of current changes being made to the subject software configuration. Preferably the workspace accumulates change sets in a merge of each artifact forming the subject software configuration and passes said accumulated change sets to the merge tool. The merge tool in turn displays or otherwise outputs to the user an indication of the accumulated change sets such that artifact merges by the user are made in the context of substantially all previous merge decisions.

Accordingly, the present invention provides a mechanism to merge multiple artifacts into another artifact and/or into a subject software configuration.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

Figure 1:
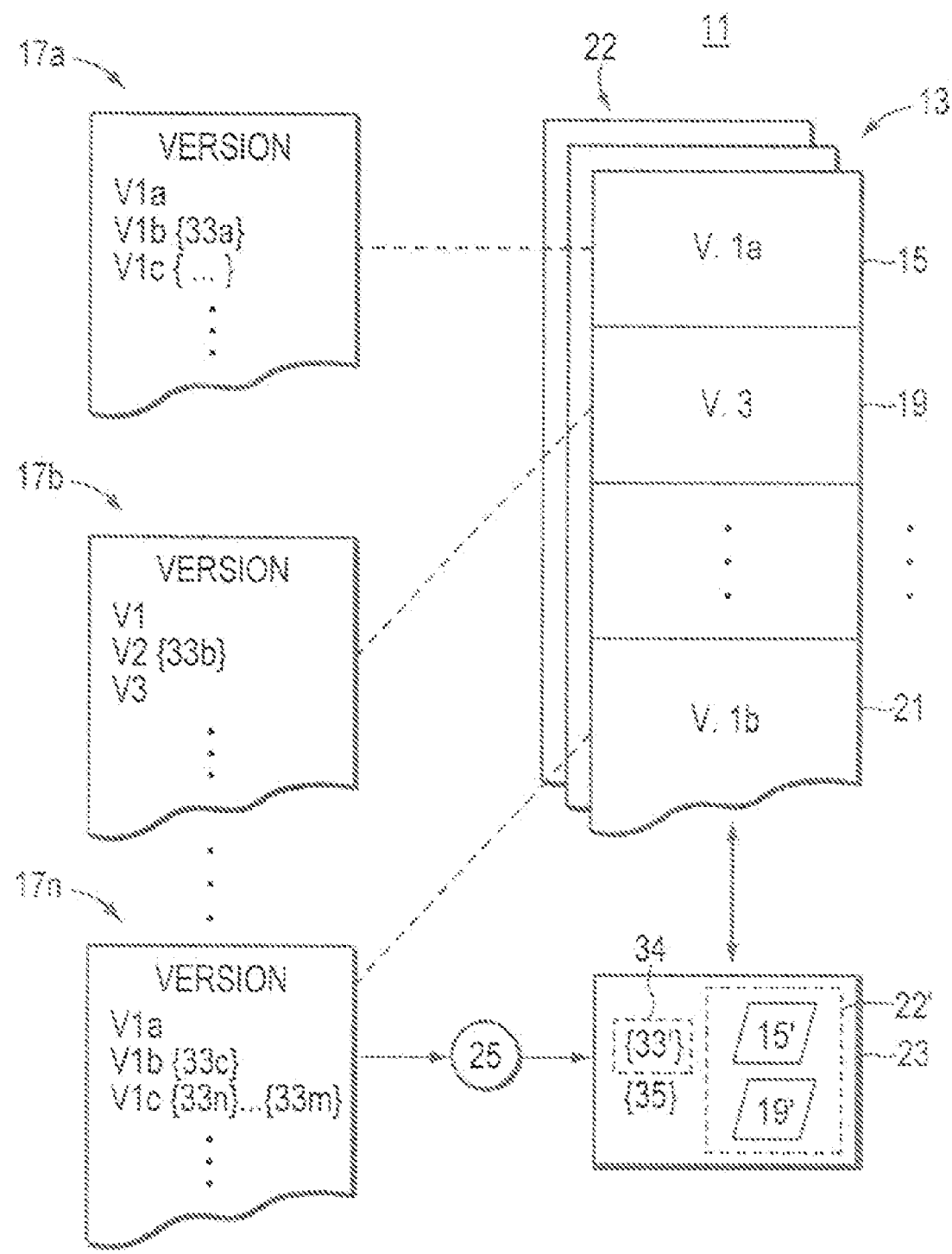
FIG. 1 is a schematic diagram of one embodiment of the present invention.

Illustrated in FIG. 1 is a configuration management system 11 embodying the present invention. Configuration management system 11 provides a workspace view of a subject software program 13 and various information regarding the subject software program 13. The software program 13 is formed of one or more artifacts 15, 19, 21. Each artifact 15, 19, 21 has respective versions, e.g., V.1a, V.3, V.1b, etc. Each configuration 22 of a subject software program 13 employs respective versions of the artifacts 15, 19, 21. One of the illustrated configurations 22 of subject software program 13 in FIG. 1 is formed to version V.1a of artifact 15, version V.3 of artifact 19 and version V.1b of artifact 21. Other configurations 22 of subject software program 13 use other version of artifacts 15, 19, 21.

Information regarding the versions of an artifact 15, 19, 21 is stored in a respective version history table of the artifact 15, 19, 21. In particular, change set information (the change set 33 to which a version belongs) is recorded in respective artifact version history table 17. FIG. 1 illustrates the one configuration 22 of subject software program 13 having version history table entry 17a for artifact 15, version history table entry 17b for artifact 19 and version history table entry 17n for artifact 21. It is understood that the configuration management system 11 stores the foregoing information for each configuration 22 of program 13.

Configuration management system 11 enables users to produce and work with (edit, test, redesign, etc.) such different configurations 22 of subject software program 13. As previously mentioned, each artifact 15, 19, 21 is a persistent result of work done by a user, typically persisted in a file system such as models and source code. An "activity" is used to track the results of work done by a user. The "change set" 33 of an activity is the set of changes to artifacts 15, 19, 21 made by the practitioner to perform the activity. A "workspace" 23 is used to define the work environment of a user—to contain the artifacts 15, 19, 21 required by that user and the activities that track the results of performing those activities. The workspace 23 is said to "accept" the activity change sets that define the current or working configuration 22'.

Restated, all changes to software artifacts 15, 19, 21 are made in the context of workspace 23. The workspace 23 identifies a change set that indicates of provides the logical change currently being performed to a configuration 22' of that workspace. When a new version of an artifact is created, a version creation tool (not shown) records in respective artifact logs 17 the new artifact version. The version creation tool further associates those changes with the current change set 33' of the workspace 23. A merge tool 25 accepts as input a list 34 of accepted and rejected change sets, and returns as output the additional change sets that have been accepted and rejected during the operation of the merge tool 25 on the working configuration 22' in workspace 23. When a merge that involves multiple artifacts 15', 19' is invoked in workspace 23, the workspace accumulates the list 34 of change sets that have been accepted and rejected in the merge of each of the multiple artifacts 15', 19' and passes the current value of this list to the merge tool 25 when it is invoked on the next artifact. The individual artifact merges are then made in the context of all previous merge decisions and the merging of software configurations 22' with a change set that spans multiple artifacts 15', 19' is smoothly accomplished.

In a preferred embodiment, when the merge tool 25 processes a first artifact 15' in a working configuration 22' that requires a merge, merge tool 25 is given (receives as input) the versions to merge and the common ancestor of those versions from artifact version logs 17. The merge-tool 25 uses the change set information 33 recorded in those versions to recognize which changes belong to which change set 33, and exposes the merge decisions to the end-user in the form of accepting or rejecting a particular change set 33. The merge-tool 25 then remembers whether the user has accepted or rejected the set of changes belonging to a given change set 33, so that when the merge-tool 25 returns control to the workspace 23, the workspace can be annotated by the accepted and rejected change sets 34.

When a subsequent merge of another artifact 19' is invoked in the workspace 23, the list 34 of accepted and rejected change sets of all previously merged artifacts in the workspace 23 are passed as an argument to the merge tool 25. The merge tool uses this information to encourage the user to make consistent decisions about accepting or rejecting a given change set 33 (namely, accepting a change if it is part of a change set that has been accepted in a previous merge, and rejecting a change set if it has been rejected in a previous merge).

If the system 11 supports change set evolution, a user will be allowed to make inconsistent decisions about accepting or rejecting changes from different artifacts (i.e. reject a change that is part of a change set that was accepted in the merge of another artifact, or accept a change that is part of a change set that was rejected in the merge of another artifact). When the user commits a set of checked-out artifacts 15", 19' containing inconsistent merge decisions, any inconsistencies are resolved by splitting the inconsistently accepted change set 33 into two change sets 33m, 33n (one containing the changes that were accepted, and the other containing the changes that were rejected).

Some versioning systems will allow the user to persist an incompletely merged artifact 15, 19, 21, i.e., an artifact which contains merge decisions that the user performing the merge wants to defer until they have seen that change set 33 in the context of the other artifacts that it affects. In this case, in addition to the accepted and rejected change sets, the merge-tool 25 also returns a list 35 of deferred change sets. When the merge-tool 25 is subsequently invoked on another artifact, and returns a change set 33' marked as being accepted or rejected, if there is a previously merged artifact that has deferred that change set (i.e., an incompletely merged artifact), the user is given an opportunity to re-invoke the merge-tool 25 on that previously incompletely merged artifact, so that the change set can be appropriately accepted or rejected in that previously merged (incompletely merged) artifact. When a user attempts to check-in a merged artifact that contains deferred change sets 35 (i.e., an incompletely merged artifact), the invention system 11 issues to the user a warning about the deferred merges, and gives the user an opportunity to re-invoke the merge tool 25 to complete the merge.

Figure 2:
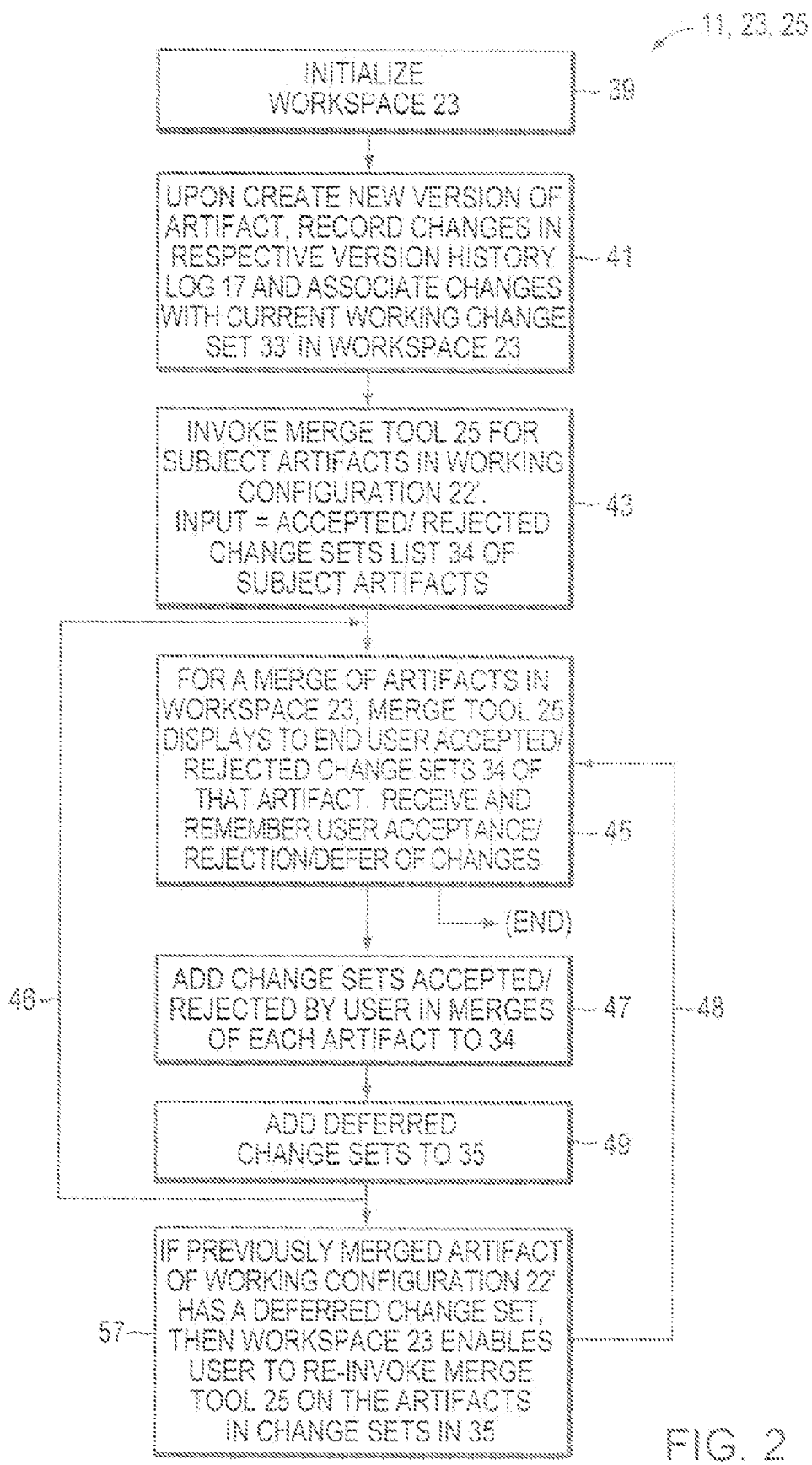
FIG. 2 is a flow diagram of a merge member in the embodiment of FIG. 1.

FIG. 2 provides a flow diagram of the operations of merge tool/means 25 and workspace 23. As a first step 39, invention system 11 initializes workspace 23 including initializing accepted/rejected change set list 34, deferred change set list 35 and other supporting data elements for a current work session. Next at 41, upon creation of a new version of an artifact, system 11 records changes in respective version history logs 17. Also system 11 associates the recorded changes with a current working change set 33' in workspace 23. When the merge tool 25 is invoked for subject artifacts in working configuration 22', step 43 provides input to merge tool 25. The input includes the change set 33 being considered, the list 34 of previously accepted and rejected change sets and list 35 of previously deferred change sets. In response to user decision (acceptance/rejection of changes in the change sets 33) for the subject artifact, merge tool 25 receives and remembers the acceptance/rejection of this change set in change set list 34.

At step 47 workspace 23 accumulates lists 33, 33' of change sets that have been accepted and rejected in the merges of each of the multiple subject artifacts 15', 19'. Similarly at step 49 the workspace 23 accumulates deferred change sets 35.

In a subsequent merge of another artifact into working software configuration 22', step 45 is again invoked via lop 46. If a previously incompletely merged artifact of working configuration 22' has a deferred change set 35, then at step 57 workspace 23 enables the end user to re-invoke the merge tool 25 on that artifact. Loop 48 back to step 45 similarly enables merging of another artifact into working software configuration 22' as needed/desired.

Figure 3:
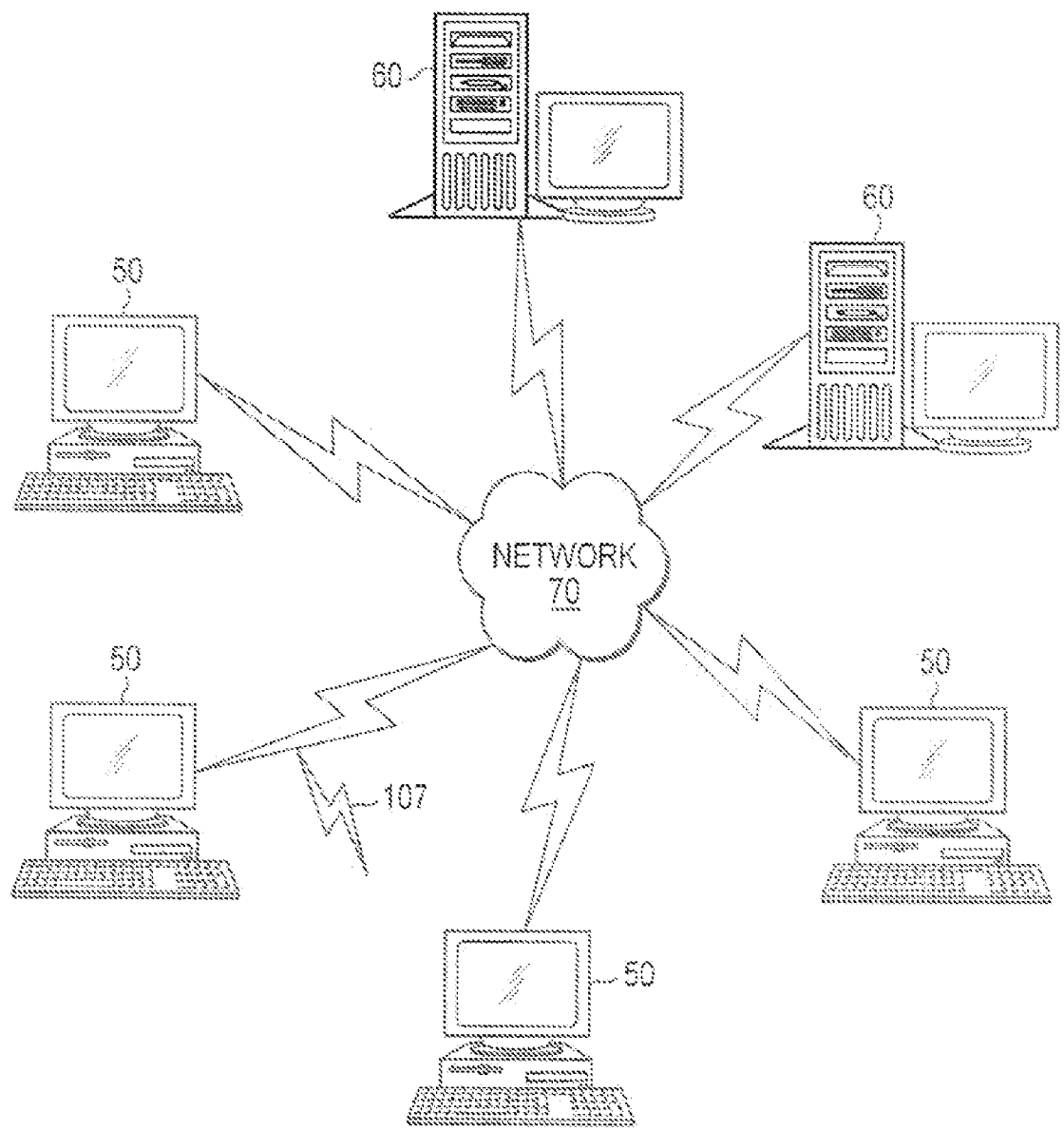
FIG. 3 is a schematic view of a computer network environment in which embodiments of the present invention may be employed.

FIG. 3 illustrates a computer network or similar digital processing environment in which the present invention may be implemented.

Client computer(s)/devices 50 and server computer(s) 60 provide processing, storage, and input/output devices executing application programs and the like. Client computer(s)/devices 50 can also be linked through communications network 70 to other computing devices, including other client devices/processes 50 and server computer(s) 60. Communications network 70 can be part of a remote access network, a global network (e.g., the Internet), a worldwide collection of computers. Local area or Wide area networks, and gateways that currently use respective protocols (TCP/IP, Bluetooth, etc.) to communicate with one another. Other electronic device/computer network architectures are suitable.

Figure 4:
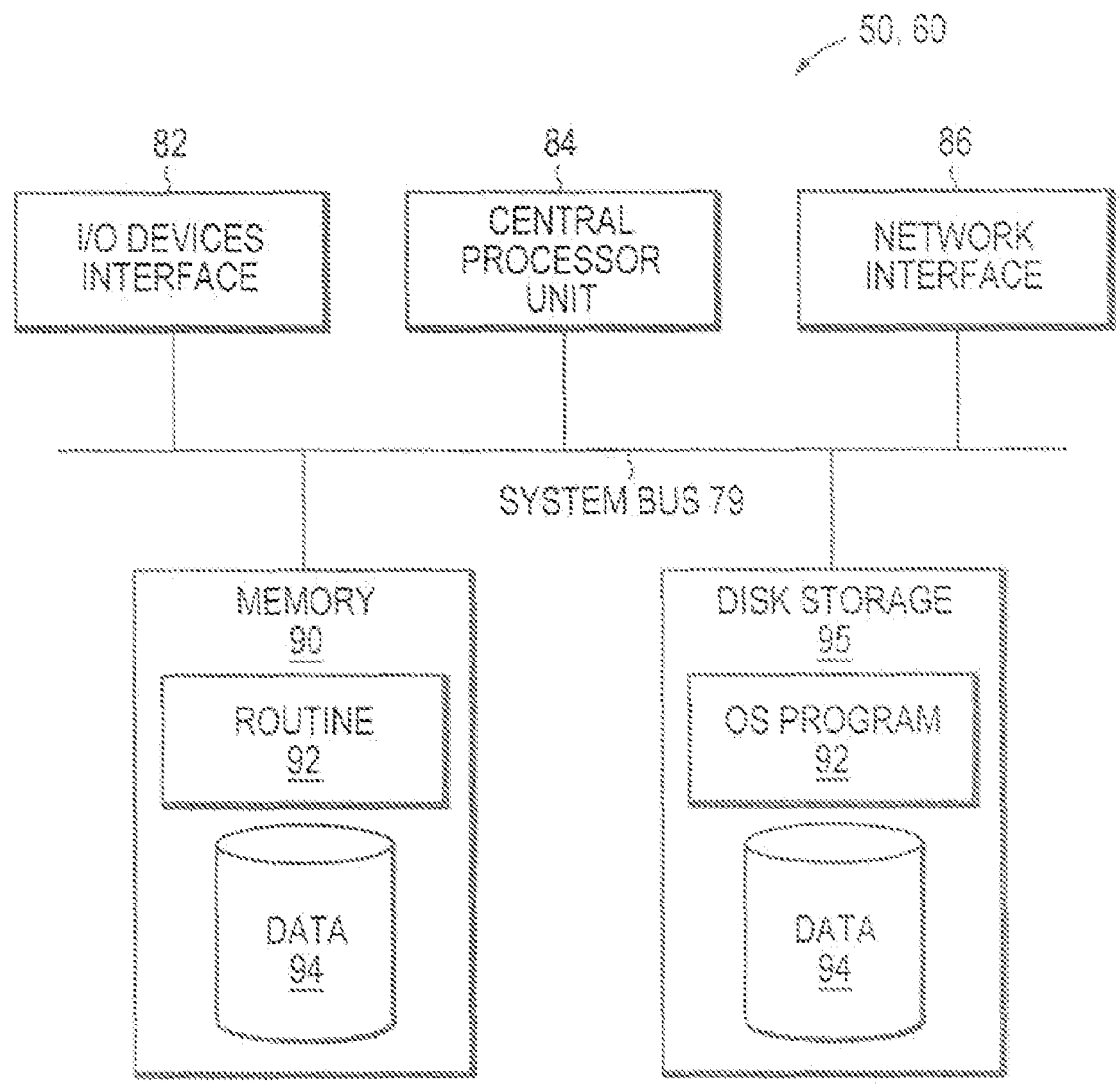
FIG. 4 is a block diagram of a computer node of FIG. 3.

FIG. 4 is a diagram of the internal structure of a computer (e.g., client processor/device 50 or server computers 60) in the computer system of FIG. 3. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50, 60. Network interface 86 allows the computer to connect to various other devices attached to a network (e.g., network 70 of FIG. 3). Memory 90 provides volatile storage for computer software instructions 92 and data 94 used to implement an embodiment of the present invention (e.g., artifact history logs/tables 17, merge tool/means 25, workspace 23, working change sets 33', list 34 of accepted/rejected change sets and deferred change sets 35 detailed above). Disk storage 95 provides non-volatile storage for computer software instructions 92 and data 94 used to implement an embodiment of the present invention. Central processor unit 84 is also attached to system bus 79 and provides for the execution of computer instructions.

In one embodiment, the processor routines 92 and data 94 are a computer program product (generally referenced 92), including a computer readable medium (e.g., a storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 107 embodied on a propagated signal on a propagation medium (e.g., a radio wave, an infrared wave, a laser wave, a sound wave, or an electrical wave propagated over a global network such as the Internet, or other networks(s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or compute readable medium can be any apparatus that can contain, store, communicate, propagate, or transport the program for use by or in connection with the instruction execution system, apparatus, or device.

The medium can be an electronics, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

While this invention has been particularly shown and described with references to example embodiments thereof, it will be understood by those skilled in the art that various changes in form and details may be made therein without departing from the scope of the invention encompassed by the appended claims.

What is claimed is:

1. Computer apparatus having a storage medium for merging software configurations, each configuration being formed of respective versions of software program artifacts, the apparatus comprising:
   a workspace providing a work environment in which to perform operations on a subject software configuration, the workspace identifying a change set of current changes being made to the subject software configuration; and a merge tool coupled to perform software configuration merges in the workspace, the workspace accumulating change sets in a merge of each artifact forming the subject software configuration and passing said accumulated change sets to the merge tool, and the merge tool responsively displays to a user an indication of the accumulated change sets such that the merge tool enables the user to make artifact merges in the context of substantially all previous merge decisions, wherein the merge tool accepts as input a list of accepted and rejected change sets recorded in respective artifact version logs, and returns as output display of an indication of additional change sets in the workspace that have been accepted and rejected by a user during current operation of the merge tool; and wherein the workspace further identifies deferred change sets, such that when the merge tool provides an indication change sets in the workspace that have been accepted and rejected an indication of additional change sets, if a previously incompletely merged artifact has deferred one of the additional change sets, the workspace enables the user to re-invoke the merge tool on the previously incompletely merged artifact.

2. Computer apparatus as claimed in claim 1 wherein the workspace accumulates lists of change sets.

3. Computer apparatus as claimed in claim 2 wherein when a merge invoked in the workspace involves multiple artifacts, the workspace accumulates the lists of change sets that have been accepted and rejected by a user in the merge of each of the multiple artifacts; and the workspace passes the accumulated lists to the merge tool for merging a next artifact in the multiple artifacts.

4. A computer method for merging software configurations, comprising the computer implemented steps of:

providing a workspace that defines a work environment in which to perform operations on a subject software configuration, said providing the workspace including identifying a change set of current changes being made to the subject software configuration;

accumulating change sets in a merge of each artifact forming the subject software configuration and using said accumulated change sets in subsequent merges of the subject software configuration, including displaying to a user an indication of the accumulated change sets such that the user is enabled to make artifact merges in the context of substantially all previous merge decisions in the subject software configuration;

accepting in the workspace as input a list of accepted and rejected change sets recorded in respective artifact versions; and returning as output from the work space an indication of additional change sets, the additional change sets being change sets in the workspace that have been accepted and rejected by a user during current operation of the workspace, wherein the workspace further identifies deferred change sets, and when the workspace provides an indication of the additional change sets, if a previously incompletely merged artifact has deferred one of the additional change sets, enabling the user to re-invoke a merge on the previously incompletely merged artifact.

5. A method as claimed in claim 4 further comprising the step of providing a merge tool coupled to perform software configuration merges in the workspace.

6. A method as claimed in claim 5 wherein the step of accumulating includes the workspace accumulating lists of change sets in a merge of each artifact forming the subject software configuration and passing said accumulated lists to the merge tool.

7. A method as claimed in claim 6 wherein when a merge invoked in the workspace involves multiple artifacts, the workspace accumulates the lists of change sets that have been accepted and rejected by a user in the merge of each of the multiple artifacts; and the workspace passes the accumulated lists to the merge tool for merging a next artifact in the multiple artifacts.

8. A computer program product comprising a computer readable storage medium having a computer readable program, wherein the computer readable program when executed on a digital processor causes a computer to:

provide a work environment in which to perform operations on a subject software configuration, in the work environment, identify a change set of current changes being made to the subject software configuration;

perform software configuration merges in the work environment, the work environment accumulating change sets in a merge of each artifact forming the subject software configuration and using said accumulated change sets in subsequent merges of the subject software configuration, including displaying to a user an indication of the accumulated change sets such that the user is enabled to make artifact merges in the context of substantially all previous merge decisions in the subject software configuration;

input to the work environment a list of accepted and rejected change sets as recorded in respective artifact versions; and return as output from the work environment an indication of additional change sets, the additional change sets being change sets in the work environment that have been accepted and rejected by a user during current operation of the work environment, wherein the work environment further identifies deferred change sets, and when the work environment provides an indication of the additional change sets, if a previously merged artifact has deferred one of the additional change sets, the computer readable program causes the computer to enable the user to re-invoke a merge on the previously merged artifact.

9. A computer program product as claimed in claim 8 wherein the computer readable program further causes the computer to couple a merge tool to perform software configuration merges in the work environment.

10. A computer program product as claimed in claim 9 wherein the work environment accumulating change sets includes accumulating lists of change sets in a merge of each artifact forming the subject software configuration and passing said accumulated lists to the merge tool.

11. A computer program product as claimed in claim 10 wherein when a merge invoked in the work environment involves multiple artifacts, the work environment accumulates the lists of change sets that have been accepted and rejected by a user in the merge of each of the multiple artifacts; and the work environment passes the accumulated lists to the merge tool for merging a next artifact in the multiple artifacts.

12. Computer software configuration management system comprising:
- a processor;
- workspace means coupled to the processor and providing a work environment in which to perform operations on a subject software configuration, the workspace means identifying a change set of current changes being made to the subject software configuration; and
- merge means for performing software configuration merges in cooperation with the workspace means, the workspace means accumulating change sets in a merge of each artifact forming the subject software configuration and passing said accumulated change sets to the merge means, including displaying to the user an indication of the accumulated change sets such that the user is enabled to make artifact merges in the context of substantially all previous merge decisions,
- wherein the merge means receives as input a list of accepted and rejected change sets, and returns as output an indication of additional change sets that have been accepted and rejected by a user, and
- wherein the workspace means further identifies deferred change sets such that when the merge means provides an indication of the additional change sets, if a previously incompletely merged artifact has deferred one of the additional change sets, the workspace means enables the user to re-invoke the merge means on the previously incompletely merged artifact.

* * * * *